July 6, 1954 H. R. DAVIDSON ET AL 2,682,801
COLOR MIXTURE COMPUTING DEVICE
Filed Jan. 25, 1952 2 Sheets-Sheet 1

J. M. Lambert
H. R. Davidson
INVENTORS

ATTORNEYS

July 6, 1954  H. R. DAVIDSON ET AL  2,682,801
COLOR MIXTURE COMPUTING DEVICE

Filed Jan. 25, 1952  2 Sheets-Sheet 2

J. M. Lambert
H. R. Davidson
INVENTORS

BY
ATTORNEYS

Patented July 6, 1954

2,682,801

UNITED STATES PATENT OFFICE 2,682,801

COLOR MIXTURE COMPUTING DEVICE

Hugh Roswell Davidson and Joseph Maximilian Lambert, Easton, Pa., assignors to General Aniline & Film Corporation, New York, N. Y., a corporation of Delaware Application January 25, 1952, Serial No. 268,176

5 Claims. (Cl. 88—14)

This invention relates to a novel color mixture computing device for determining the amounts of several individual color materials which should be mixed to match or approximate as closely as possible a given standard color.

In the manufacture and use of dyestuffs there are many problems of shading one color with one or more different colors. For example, when a batch of dyestuff has been manufactured it is frequently off shade from the standard and must be brought to the standard shade by mixture with small amounts of shading dyes. One method in general use at present is to make solutions of the batch and the standard and estimate by eye the amount of shading required. The purpose of this invention is to provide a simple means of calculating the required amounts of shading dyes. It may also be used in any colorimetric problem in which one desires to match the color of one solution by mixing several others together.

It is an object of this invention to provide a device by which the amounts of individual colors which must be mixed together to form a mixture having a standard color may readily be determined. Other and further objects of the invention will be apparent as the present description progresses.

The device of the present invention is illustrated in the accompanying drawings wherein—

Figure 1:
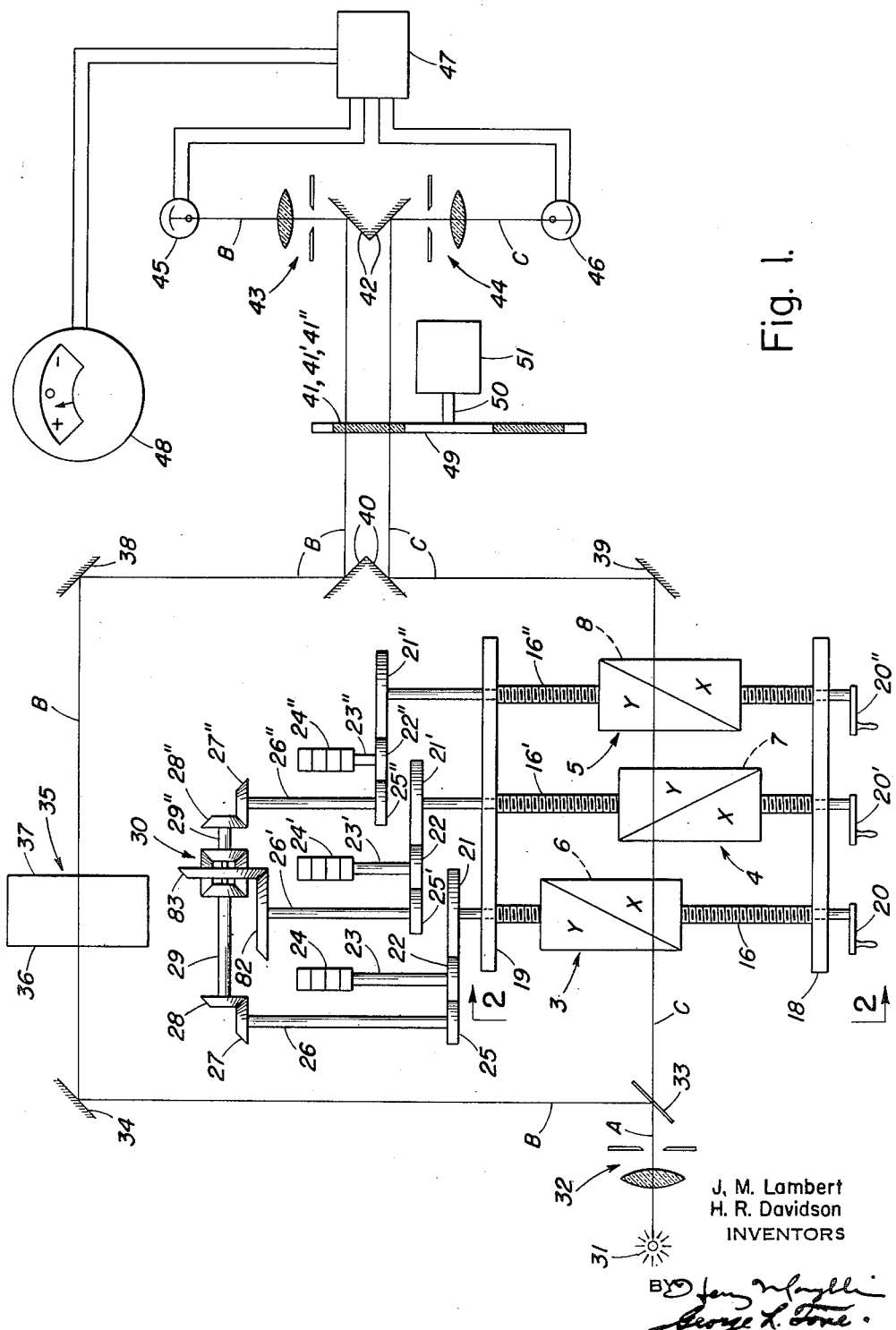
Figure 1 is a diagrammatic illustration largely in plan of the device of the present invention.

Referring to the drawings, 3, 4, and 5 are identical transparent cells carried by identical cell carriers 6, 7, and 8, respectively. Lugs 12 extend from the bottom of the cell carriers. Considering the cell carrier 6, this is slidably supported on rod 14 passing through holes 15 on lugs 12 and is also supported on lead screw 16 passing through and engaging threaded holes 17 on the lugs. Rod 14 is secured in plates 18 and 19 and lead screw 16 is journalled in plates 18 and 19. Lead screws 16 terminates at its outer end in crank 20. At its inner end the lead screw 16 has fixedly mounted thereon gear 21. Gear 21 meshes with gear 22 fixedly mounted on shaft 23 connected to counter or indicating mechanism 24. Gear 22, in turn, meshes with gear 25 fixedly mounted on shaft 26 to which gear 27 is fixedly mounted which, in turn, meshes with gear 28 fixedly mounted on shaft 29 which is connected to differential gearing 30. Each of the cell carriers 7 and 8 is similarly connected to counter mechanisms and to differential gearing 30. Cell carrier 7 is supported on rod 14' and lead screw 16' having fixedly mounted thereby gear 21' which meshes with gear 22' fixedly mounted on shaft 23' connected to counter mechanism 24'. Gear 22' meshes with gear 25' fixedly mounted on shaft 26' and through gear 82 fixedly mounted thereon is connected to differential gearing 30. Cell carrier 8 is supported on rod 14" and lead screw 16" on which is fixedly mounted gear 21" meshing with gear 22" fixedly mounted on shaft 23" or counter mechanism 24". Gear 22" meshes with gear 25" meshing with gear 28" fixedly mounted on shaft 29" connected to differential gearing 30.

Figure 5:
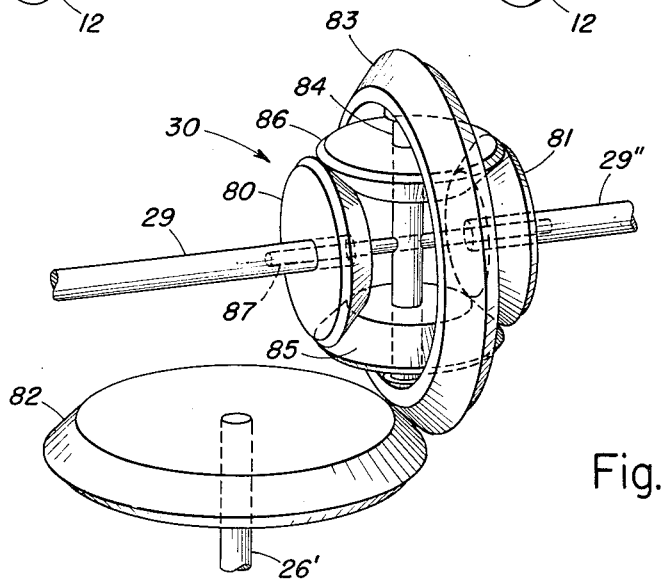
Figure 2:
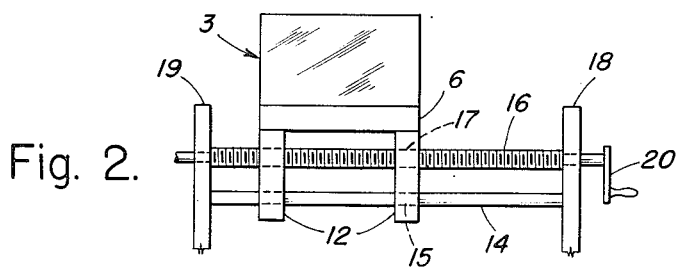
Figure 2 is an elevation showing the means for mounting an individual color cell in the device.

Differential gearing element 30 is illustrated in slightly greater detail in Figure 5. As there illustrated, shaft 29 has gear 80 fixedly mounted on its end and shaft 29" has gear 81 fixedly mounted on its end; shaft 26' has gear 82 fixedly mounted on its end; gear 82 meshes with gear 83 within which is mounted shaft 84 on which gears 85 and 86 are rotatably mounted and, as illustrated, gears 85 and 86 mesh with gears 80 and 81. Shaft 84 may be further supported by crosspiece 87, journalled in the ends of shafts 29 and 29".

Light rays from a source of light 31 are collimated by passing through a lens and aperture system 32 so that a light beam A emerges therefrom which is directed onto a half silvered mirror 33. The half silvered mirror 33 splits the light beam A into two beams, B and C. One of these light beams (designated C in the drawings) passes through cells 3, 4, and 5. The other light beam (designated B in the drawings) passes to mirror 34 and thence through cell 35. Cell 35 is constructed with transparent (glass) sides 36 and 37, so spaced that the total path length through cell 35 is equal to the maximum path length through sections of the cells 3, 4, and 5. On passing through the cells, light beams B and C are brought close together by mirrors 38 and 39 respectively and made parallel by mirrors 40 and then pass through filter 41 and fall on mirrors 42 which direct them through two exit apertures and focusing systems 43 for light beam B and 44 for light beam C onto photocells 45 for light beam B and 46 for light beam C. The electrical output of the photocells 45 and 46 are opposed and amplified in a standard electronic system 47, the output of which appears on meter 48.

The electronic system 47 is not described in detail herein since it does not, per se, form part of the present invention. Suitable electronic circuits, using vacuum phototubes and associated electronic tube circuitry, are described in the art, for example "Handbook of Industrial Electronic Circuits"—Markus and Zeluss, and references given therein such as:

(a) "Microdensitometer Circuit for Measuring Turbidity of Chemical Solutions"—S. R. Winters—Electronics, July 1944, p. 224.
(b) "Sensitive Photoelectric Light-Balance Indicator," F. H. Shepard, Jr.—RCA Rev., October 1937, p. 149.
(c) "Balanced Phototube Circuit for Precise Comparison of Illumination Intensities"—D. G. Fink—Electronics, June 1934, p. 190.
(d) "Precision Photoelectric Color-Matching Circuit for Ink or Dyed Papers"—E. L. Deeter—Electronics, September 1938, p. 18.

Photoelectric circuits using self-generating barrier-layer photoelectric cells and associated circuitry are further described in:

(1) Review of Scientific Instruments 8,279 (1937) by B. A. Brice.
(2) Industrial Engineering Chemistry, Analytical Edition 6, 167–9 (1934) by Wilcox.

Filter 41 is mounted on disc 49 on which a plurality of different filter elements 41', 41'', etc. are mounted. Disc 49 is mounted on shaft 50 of motor 51 whereby it is rotated so that different filters are introduced into the light beams B and C so that the quantity of light falling on photocells 45 and 46 is examined in different portions of the spectrum.

Figure 3:
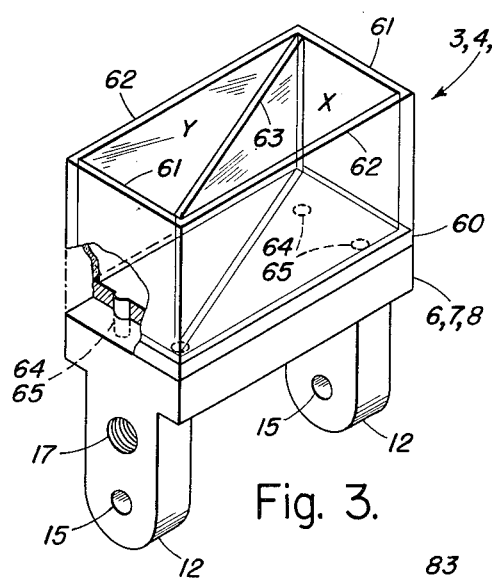
Figure 3 is a detailed perspective view of an individual color cell employed in the device of this invention.

A form of cell which may be used for cells, 3, 4, and 5 is illustrated in Figure 3. As there illustrated, the cell is in the form of an open top hollow rectangular block and comprises a bottom 60, ends 61 and sides 62, the sides 62 being formed of transparent material such as glass. A diagonal partition 63 divides the cell into wedge shaped sections, X and Y. The partition 63 is also formed of transparent material such as glass. Means are preferably provided on the bottom 60 of the cell for positioning the same on the cell carriers and, as illustrated in the drawings, these means may comprise lugs 64 which fit into holes 65 on the cell carriers so as to properly position the cell on the cell carrier.

Figure 4:
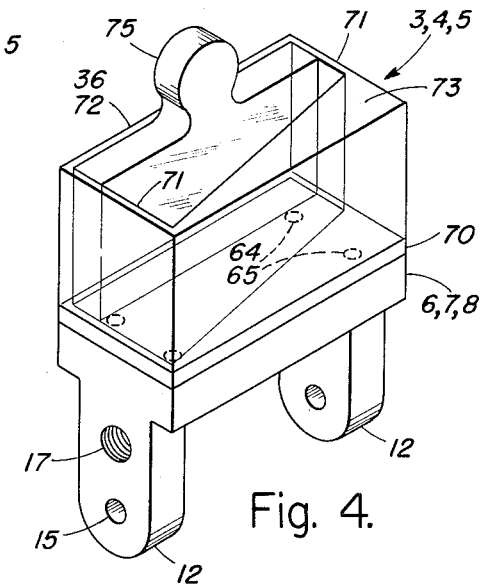
Figure 4 is a detailed perspective view of a modified form of an individual color cell and Figure 5 is a detailed perspective view of differential gearing employed in the device.

A modified form of cell is illustrated in Figure 4 and comprises bottom 70, ends 71 and sides 72 and 73. A glass plunger 75 is provided which may be inserted into the cell so as to reduce the path length through the solution in the cell, thus adjusting the overall optical density to a desirable value.

The operation of the device described above is as follows:

A solution of the dye to be matched is placed in cell 35. In one section (X) of the cell 3 there is placed a solution of one of the individual dyes to be used in making the match, and the cell is placed on cell carrier 6. A solution of another of the dyes to be used in making the match is placed in section X of cell 4 and this cell is placed on cell carrier 7. A solution of the third dye to be used in making the match is placed in section X of cell 5 and this cell is placed on cell carrier 8. Sections Y of cells 3, 4, and 5 may be filled with water. The device is turned on and the deflection of meter 48 is noted as cranks 20, 21' and 21'' are rotated; thereby, moving the cells 3, 4, and 5 into and out of light beam C. It will be noted that the cell carriers are interconnected through differential gearing 30 so that as cell 3, for example, is moved into the light beam C (whereby a thicker portion of the wedge shaped solution of dye in section X thereof enters light beam C); cells 4 and/or 5 will necessarily be moved out of the light beam C (whereby the light beam passes through a thinner portion of the wedge shaped solution of dye carried in section X thereof). As the cranks 20, 21' and 21'' are adjusted, the total path length of light beam C (through the solutions in the cells 3, 4, and 5) is thus maintained standard through differential 30 and is equal to the path length through cell 35. These adjustments are continued until the meter reading is zero. At the same time disc 49 is rotated whereby various filters 40, 41' etc. are rotated into and out of the light beams B and C. When the output of the meter is zero for all filters, the light coming through the cells 3, 4, and 5 is the same color as that coming from cell 35. Since the path length through each cell is proportional to its position in the light beam and since the position for each of cells 3, 4, and 5 is recorded on counters 24, 24' and 24'', respectively, the proper proportions in which to mix the dyestuffs whose solutions are contained in cells 3, 4, and 5 in order to match the deystuff whose solution is contained in cell 35 can be read correctly from counters 24, 24' and 24'', respectively. If the dyestuffs in the cells carried on cell carriers 3, 4, and 5 are mixed in proportion to the path length through each one (as read from counters 24, 24' and 24'') the resulting mixtures will be the same color as that in cell 35. In cases where a zero reading cannot be obtained on meter 48, the minimum reading will indicate the closest match obtainable by mixing the three dystuffs whose solutions are contained in the cells 3, 4, and 5.

It will be apparent that the foregoing is a description of a specific embodiment of the present invention and that various modifications thereof will suggest themselves to those skilled in the art. Thus, as described above, the device, in effect, gives a measurement of a color match under one illuminant. If it is desirable to investigate the match under different illuminants, filters may be inserted in light beam A before it is split at mirror 33.

It will also be apparent that, while the device described and illustrated herein is intended for determining the relative amounts of two or three colors which should be mixed to match a given standard, those skilled in the art could add further cell carriers which will be interconnected through differential gearing of the cell carriers illustrated in the device described whereby the relative amounts of a plurality of colors which should be mixed to equal a given standard can be determined.

It will be apparent that if only two colors are to be mixed one of the cell carriers may be locked in position out of the path of the light beam C and the relative amounts of two components to be mixed to match a given standard may thus be determined.

We claim:

1. A color mixture computer which comprises the combination of a holder for a sample of color to be matched, a plurality of individual holders for samples of colors to be mixed to match said first mentioned sample, means for transmitting a light beam through said first mentioned holder, means for transmitting a similar light beam through said plurality of holders, means for changing the position of each of said individual holders in the path of said second mentioned light beam to thereby vary the length of the path of said second mentioned light beam through each of said plurality of holders, said last mentioned means being interconnected whereby the total length of the path of said second mentioned light beam through said plurality of holders remains constant when the length of its path through individual holders of said plurality of holders is varied and means for comparing said light beams after they have passed through said holders.

2. A color mixture computer which comprises the combination of a holder for a sample of color to be matched, a plurality of individual holders for samples of colors to be mixed to match said first mentioned sample, means for transmitting a light beam through said first mentioned holder, means for transmitting a similar light beam through said plurality of holders, means for changing the position of each of said individual holders in the path of said second mentioned light beam to thereby vary the length of the path of said second mentioned light beam through each of said plurality of holders, said last mentioned means being interconnected whereby the total length of the path of said second mentioned light beam through said plurality of holders remains constant when the length of its path through individual holders of said plurality of holders is varied, means for comparing said light beams after they have passed through said holders and means for inserting light filters into said light beams between said holders and said means for comparing said light beams whereby said light beams may be compared in different portions of the spectrum.

3. A color mixture computer which comprises the combination of a source of collimated light rays, means for splitting said collimated light rays into two similar light beams, a holder for a sample of color to be matched disposed in the path of one of said light beams, a plurality of holders of samples of colors to be mixed to match said first mentioned color disposed in the path of the other of said light beams, means for changing the position of each of said individual holders in the path of said second mentioned light beam to thereby vary the length of the path of said second mentioned light beam through each of said plurality of holders, said last mentioned means being interconnected whereby the total length of the path of said second mentioned light beam through said plurality of holders remains constant when the length of its path through individual holders of said plurality of holders is varied and means for comparing said light beams after they have passed through said holders.

4. A color mixture computer which comprises the combination of a source of collimated light rays, means for splitting said collimated light rays into two similar light beams, a holder for a sample of color to be matched disposed in the path of one of said light beams, a plurality of holders of samples of colors to be mixed to match said first mentioned color disposed in the path of the other of said light beams, means for changing the position of each of said individual holders in the path of said seocnd mentioned light beam to thereby vary the length of the path of said second mentioned light beam through each of said plurality of holders, said last mentioned means being interconnected whereby the total length of the path of said second mentioned light beam through said plurality of holders remains constant when the length of its path through individual holders of said plurality of holders is varied, means for comparing said light beams after they have passed through said holders and means for inserting light filters into said light beams between said holders and said means for comparing said light beams whereby said light beams may be compared in different portions of the spectrum.

5. A color mixture computer which comprises the combination of a holder for a sample of color to be matched, a plurality of individual holders each for holding a wedge-shaped color sample of colors to be mixed to match said first mentioned sample, means for transmitting a light beam through said first mentioned holder, means for transmitting a similar light beam through said plurality of holders, individual carriers for each of said plurality of holders, a rotatable screw supporting each of said individual carriers, means for rotating said screws whereby said individual carriers and the wedge-shaped sample holders carried thereby may be moved into and out of the path of said second mentioned light beam whereby the length of the path of said second mentioned light beam through each of said individual holders may be varied, differential gearing interconnecting said screws whereby when one individual holder is moved into said second mentioned light beam other of said individual holders are moved out of said light beam so that the total length of path of said second mentioned light beam through said plurality of individual holders remains constant and means for comparing said light beams after they have been through said holders.

References Cited in the file of this patent

UNITED STATES PATENTS

| Number | Name | Date |
|---|---|---|
| 2,050,608 | Hellige | Aug. 11, 1936 |
| 2,152,645 | Holven et al. | Apr. 4, 1939 |
| 2,178,211 | Nolan | Oct. 31, 1939 |
| 2,292,230 | Lemon | Aug. 4, 1942 |

FOREIGN PATENTS

| Number | Country | Date |
|---|---|---|
| 34,205 | France | Dec. 8, 1928 |
| | Third Addition to Pat. No. 563,227 | |
| 966,960 | France | Mar. 15, 1950 |